(12) United States Patent
Fan et al.

(10) Patent No.: US 12,462,083 B1
(45) Date of Patent: Nov. 4, 2025

(54) AI-BASED AUTOMATED CIRCUIT GENERATION METHOD

(71) Applicant: AIChipSky Microelectronics Co., Ltd., Chengdu (CN)

(72) Inventors: Tingting Fan, Chengdu (CN); Wenjie Deng, Chengdu (CN); Fei Zhao, Chengdu (CN)

(73) Assignee: AIChipSky Microelectronics Co., Ltd., Chengdu (CN)

( * ) Notice: Subject to any disclaimer, the term of this patent is extended or adjusted under 35 U.S.C. 154(b) by 0 days.

(21) Appl. No.: 19/206,061

(22) Filed: May 13, 2025

(30) Foreign Application Priority Data

Apr. 24, 2025 (CN) .......................... 202510522868.6

(51) Int. Cl.
*G06F 30/323* (2020.01)
*G06N 3/0455* (2023.01)

(52) U.S. Cl.
CPC ......... *G06F 30/323* (2020.01); *G06N 3/0455* (2023.01)

(58) Field of Classification Search
CPC .... G06F 30/323; G06F 30/327; G06N 3/0455
See application file for complete search history.

*Primary Examiner* — Jack Chiang
*Assistant Examiner* — Aric Lin
(74) *Attorney, Agent, or Firm* — Birchwood IP

(57) ABSTRACT

Disclosed is an AI-based automated circuit generation method. The method includes obtaining design metrics; capturing a dependency relationship among design metrics by using an attention mechanism, extracting features by using a multi-layer Transformer structure to obtain an overall structure and a high-level feature representation of a circuit, and matching the high-level feature representation with a standard circuit netlist template based on the overall structure of the circuit to obtain a current circuit netlist; simulating the current circuit netlist to obtain a simulation report, and extracting error information from the simulation report; and correcting the current circuit netlist based on the error information, simulating a corrected circuit netlist again, looping until there are no errors in the simulation report, and outputting a final circuit netlist. The present invention solves the problems that the existing method has limitations and is difficult to quickly, automatically and flexibly design a complex circuit.

7 Claims, 1 Drawing Sheet

---

Obtaining design metrics and storing the design metrics as structured data

↓

Capturing a dependency relationship among design metrics by using an attention mechanism, extracting features by using a multi-layer Transformer structure to obtain an overall structure and a high-level feature representation of a circuit, and matching the high-level feature representation with a standard circuit netlist template based on the overall structure of the circuit to obtain a current circuit netlist

↓

Simulating the current circuit netlist to obtain a simulation report and extracting error information from the simulation report

↓

Correcting the current circuit netlist based on the error information, simulating a corrected circuit netlist again, looping several times until there are no errors in the simulation report, and outputting the circuit netlist

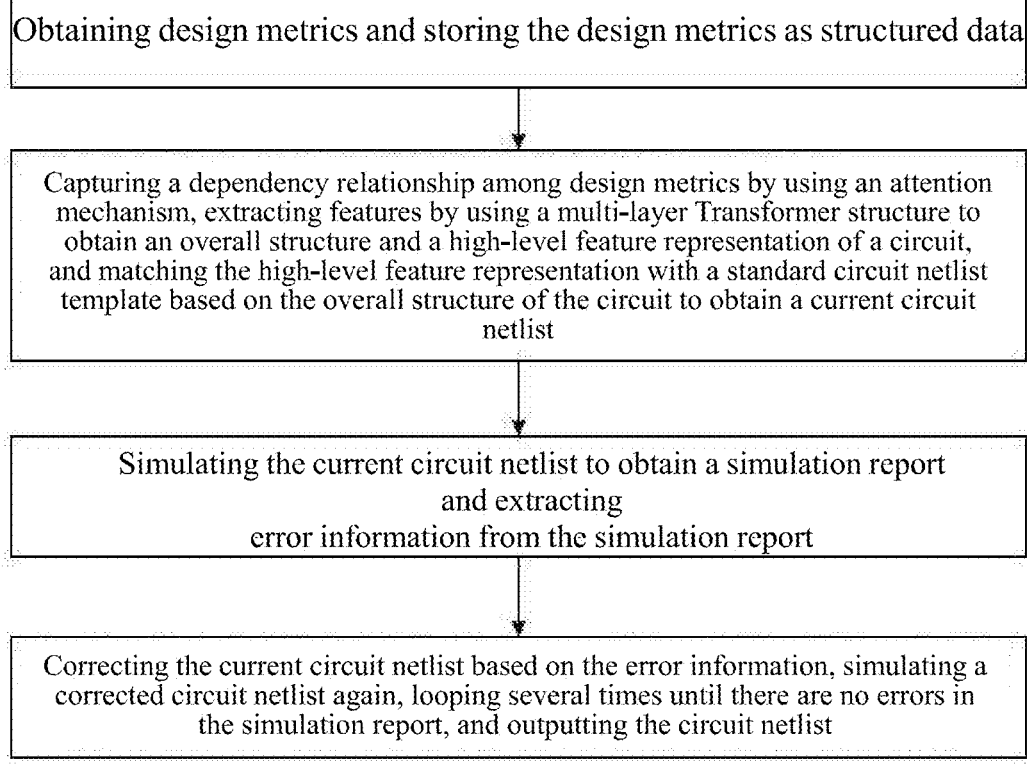

AI-BASED AUTOMATED CIRCUIT GENERATION METHOD

CROSS-REFERENCE TO RELATED APPLICATIONS

This application claims priority to Chinese Patent Application No. 202510522868.6, filed on Apr. 24, 2025, which is hereby incorporated by reference in its entirety.

TECHNICAL FIELD

The present invention belongs to the field of circuit design, and particularly relates to an AI-based automated circuit generation method.

BACKGROUND

In a conventional circuit design process, an engineer usually relies on manual design of a corresponding circuit structure, combined with EDA tools (such as Cadence and Hspice) for repeated adjustments, modifications and verifications. Since manual design requires years of experience accumulation, simulation errors need to be manually checked one by one, and circuit performance needs to be iterated, modified and simulated many times, this process has problems such as long design cycles, low debugging efficiency, and high resource consumption. This process has led to limitations and problems in the integrated circuit field, such as long development cycles, slow product upgrades, and high costs. Although some EDA tools related to automated assisted design have appeared, these EAD tools generally have limitations and are difficult to perform complex designs quickly and flexibly, especially for the design of analog circuits, and lack intelligent automatic design capabilities.

SUMMARY

Aiming at the defects in the prior art, the present invention provides an AI-based automated circuit generation method, which solves the problems that the existing method generally has limitations and is difficult to quickly, automatically and flexibly design a complex circuit.

To achieve the objective of the present invention, the present invention adopts the following technical solution. An AI-based automated circuit generation method includes: obtaining design metrics and storing the design metrics as structured data; wherein the design metrics include circuit performance metrics, component metrics, circuit type metrics, and component connection methods;
- capturing a dependency relationship among design metrics by using an attention mechanism, extracting features by using a multi-layer Transformer structure to obtain an overall structure and a high-level feature representation of a circuit, and matching the high-level feature representation with a standard circuit netlist template based on the overall structure of the circuit to obtain a current circuit netlist;
- simulating the current circuit netlist to obtain a simulation report, and extracting error information from the simulation report; and
- correcting the current circuit netlist based on the error information, simulating a corrected circuit netlist again, looping several times until there are no errors in the simulation report, and outputting a final circuit netlist.

The beneficial effects of the present invention are as follows: automatic generation from functional requirements to circuit netlists is achieved, and a natural language parsing module and a circuit structure embedded coding mechanism are introduced, which can automatically convert circuit design goals input by a user into structured representations, and further generate candidate circuit structures, thereby reducing the manual modeling process and improving design efficiency. According to a closed-loop simulation correction mechanism, the first-time simulation pass rate is effectively improved. After the initial circuit generation, the syntax errors and performance deviations in the netlist are automatically identified based on the simulation feedback, and the syntax repair, parameter optimization or structure adjustment strategies are called according to the error type, which effectively improves the availability of the netlist and the convergence speed of circuit performance. Deep design semantics are extracted by using a multi-layer attention mechanism. A multi-head self-attention module in the Transformer structure captures the structural correlation and cross-module information in the circuit, which has stronger design transferability and generalization capabilities, and improves the scope of applicability in complex circuit scenarios. The compatibility and adaptability of multi-platform netlist output are provided, the internally generated design data is automatically mapped into a netlist format (such as HSPICE and NGspice) supported by a target platform according to EDA software standards specified by users, the compatibility with a mainstream simulation platform is ensured, and the deployment flexibility is improved. The extension of multiple types of design tasks such as analog circuits and integrated circuits is supported. Through multi-layer feature extraction and template migration mechanism, this method can handle complex circuit modules containing continuous time domain behavior and high-frequency signal characteristics, and has a wide range of scenario adaptation capabilities. The number of simulations and computing resource overhead are effectively reduced. Through high-level feature compression expression and template screening strategies, the system may quickly position potential feasible solutions in the design space, avoid redundant simulations and exhaustive traversal, significantly shorten the circuit development cycle and save computing resources.

BRIEF DESCRIPTION OF DRAWINGS

FIG. 1 is a flow chart of a method according to the present invention.

DETAILED DESCRIPTION OF EMBODIMENTS

The following description of the specific embodiments of the present invention is provided to facilitate the understanding of the present invention by those skilled in the art, however, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

As shown in FIG. 1, in an embodiment of the present invention, an AI-based automated circuit generation method includes:

obtaining design metrics and storing the design metrics as structured data; wherein the design metrics include circuit performance metrics, component metrics, circuit type metrics, and component connection methods;

capturing a dependency relationship among design metrics by using an attention mechanism, extracting features by using a multi-layer Transformer structure to obtain an overall structure and a high-level feature representation of a circuit, and matching the high-level feature representation with a standard circuit netlist template based on the overall structure of the circuit to obtain a current circuit netlist;

simulating the current circuit netlist to obtain a simulation report, and extracting error information from the simulation report; and correcting the current circuit netlist based on the error information, simulating a corrected circuit netlist again, looping several times until there are no errors in the simulation report, and outputting a final circuit netlist.

In this embodiment, design metrics input by a user, such as circuit performance metrics (gain, noise, and the like), component metrics (capacitance, resistance, and the like), circuit type metrics (amplifiers, filters, and the like), and component connection methods (series connection, parallel connection, and the like) are received. For example, a user requires to design a low-noise amplifier with an operating frequency of 2 GHz-6 GHZ, which meets the following requirements: 1. Operating frequency band: 2 GHz-6 GHz; 2. Gain: 10 dB±1 dB; 3. Noise figure: better than 5 dB; 4. Linearity: input 1 dB compression point better than-10 dBm; 5. Power consumption: 40 mW; 6. Circuit stability: kf greater than 1; and 7. Input and output impedance: 50 ohms (reflection coefficients at an input port S11 and an output port S22 are less than or equal to −10 dB). The local circuit design model analyzes the requirements proposed by the user, segments an input text into subwords by a word segmenter, and extracts key design metrics from a word segmentation result by using a natural language processing technology, such as "amplifier", "low noise", "operating frequency band: 2 GHZ-6 GHz", "noise figure: 5 dB", "gain: 10 dB±1 dB". The system then parses these design metrics and converts the design metrics into a structured data format, usually in the form of key-value pairs, where each metric corresponds to a specific value, for further processing. These structured data include specific values for various design requirements and corresponding types thereof, such as circuit type, performance requirements, and parameter ranges.

The obtaining a current circuit netlist is specifically as follows:

calculating relevant weights of the design metrics by using normalization operation according to the structured data:

$$w_i = \frac{\exp(s_i/T)}{\sum_j \exp(s_j/T)}$$

wherein $w_i$ is a relevant weight of an $i^{th}$ design metric; $s_i$ is an initial weight score of a $i^{th}$ design metric; T is a temperature coefficient; $s_j$ is an initial weight score of a $j^{th}$ design metric;

calculating a dependency relationship among design metrics by using an attention mechanism:

$$\text{Attention}(Q, K, V) = \text{softmax}\left(\frac{QK^T}{\sqrt{d_k}} + B\right)V$$

wherein Attention (Q, K, V) is a dependency relationship between a current design metric and all design metrics; soft max is an activation function; Q is a query matrix, which represents the current design metric; K is a key matrix, which is composed of various design metrics; $d_k$ is a key dimension; B is a bias term; V is a value matrix, which represents a weight vector related to the design metric; T is transpose;

extracting features by using a multi-layer Transformer structure according to the dependency relationship among design metrics to obtain an overall structure and a high-level feature representation of a circuit;

calculating matching scores of features in the high-level feature representation and embedded representations in the standard circuit netlist template, and extracting embedded representations of which matching scores are greater than a threshold to obtain a matching template set; and based on the overall structure of the circuit, selecting any one embedded representation from the matching templates of features in the high-level feature representation, and obtaining the current circuit netlist based on the embedded representations selected corresponding to the features.

In this embodiment, the converted structured data is used to dynamically calculate a relevant weight of each design metric based on an attention mechanism, so as to measure the importance and the correlation of parameters. The temperature coefficient is used to control the smoothness of the distribution. This weight is used to guide the model to focus on high priority design requirements while ensuring that secondary parameters are not ignored. In terms of dependency relationship capture, the dependencies between parameters are calculated mainly using the self-attention mechanism, through which it is possible to automatically learn which design metrics have strong correlations, such as gain, noise figure and linearity, which often affect each other in an amplifier, thereby optimizing the design solution. The captured dependency relationship is used to guide the feature extraction process of the Transformer layers, ensuring that the network focuses on the core constraints of the circuit design.

The extracting features by using a multi-layer Transformer structure according to the dependency relationship among design metrics to obtain an overall structure and a high-level feature representation of a circuit specifically includes:

a first-layer Transformer structure, used to extract a local parameter relationship based on the dependency relationship among the design metrics;

a second-layer Transformer structure, used to extract global features based on the local parameter relationship; and a third-layer Transformer structure, used to extract the overall structure and the high-level feature representation of the circuit based on global features, combined with circuit templates and historical circuit design cases.

The extracting a local parameter relationship based on the dependency relationship among the design metrics is specifically as follows:

linearly transforming and positionally encoding structured data to obtain input data extracted from the circuit:

$$Q_{in} = XW^Q$$
$$K_{in} = XW^K$$
$$V_{in} = XW^V$$

wherein $Q_{in}$ is a query vector of input data extracted from the circuit; X is the structured data; $W^Q$, $W^K$ and $W^V$ are all trainable weight matrices; $K_{in}$ is a key vector of input data extracted from the circuit; $V_{in}$ is a value vector of input data extracted from the circuit; and inputting the input data extracted from the circuit into a multi-head self-attention mechanism to obtain the local parameter relationship; wherein a bias term of the multi-head self-attention mechanism of the first-layer Transformer structure is the dependency relationship among design metrics.

An expression for the global feature is as follows:

$$H_2' = LayerNorm(H_2 + FFN(H_2))$$
$$H_2 = LayerNorm(H_1 + Attention(H_1 W_1^Q, H_1 W_1^K, H_1 W_1^V))$$

wherein $H_2'$ is the global feature; LayerNorm is layer normalization operation; $H_2$ is an intermediate representation; FFN is a feedforward neural network; $H_1$ is the local parameter relationship; and $$W_1^Q,$$

$$W_1^K$$

and $$W_1^V$$

are all trainable weight matrices that map data to vectors.

An expression for the overall structure and the high-level feature representation of the circuit is as follows:

$$S = f_{struct}(H_{final}) = \sigma(W_s \cdot H_{fused} + b_s)$$
$$H_{final} = Concat(H_2', E_{hist})W_{fusion}$$
$$F = f_{feat}(H_{final}) = MLP(GlobalAvgPool(H_{final})) = W_f \cdot \left(\frac{1}{n}\sum_{i=1}^{n} H_{final}^{(i)}\right) + b_f$$

wherein S is the overall structure of the circuit; $f_{struct}$ is a structure generation function; $H_{final}$ is a final fused hidden state; σ is an activation function; $W_s$ is a structure mapping matrix used to project a high-dimensional feature space into a structure label space; $H_{fused}$ is a circuit feature representation that combines structural semantics of a current circuit state and a historical circuit template; $b_s$ is a bias vector; Concat is connection operation; $H_2'$ is the global feature; $E_{hist}$ is historical circuit encoding; $W_{fusion}$ is a fusion weight matrix; F is a high-level feature representation; $f_{feat}$ is a high-dimensional feature mapping function used to extract key design features from the final fused hidden state $H_{final}$; MLP is a high-dimensional mapping layer; GlobalAvgPool is global average pooling; $W_f$ is a weight of the high-dimensional mapping layer; n is a number of structural units in the circuit; $H_{final}^{(i)}$ is a final feature sequence after fusion; and $b_f$ is a bias of the high-dimensional mapping layer.

In this embodiment, in the Transformer structure, the input data is a processed circuit design parameter matrix. The parameter matrix is composed of structural design metrics extracted in the early stage, including circuit performance metrics, component metrics, circuit type metrics and component connection methods, which are encoded and normalized to form a numerical input format acceptable to the model. Each layer of Transformer blocks consists of a multi-head self-attention mechanism and a feedforward neural network. The output of the previous layer serves as the input of the next layer, enabling the model to learn feature relationships at different levels in depth. The first layer mainly learns local parameter relationships, such as the matching between frequency range and gain.

The first-layer attention mechanism introduces the dependency relationship among design metrics (such as voltage-current relationship, gain-frequency coupling) as explicit bias information into the attention score calculation. Specifically, when the attention score is calculated, the bias term is composed of the extracted design dependency matrix to strengthen the focus on the intrinsic coupling between key design metrics. This mechanism can guide the attention distribution to be closer to a circuit design logic during the feature aggregation process, thereby improving the ability to model circuit behavior features.

The middle layer focuses on global features, including circuit stability and power optimization. After receiving the output $H_1$ of the previous layer, this layer inputs the output and processes the output again with the multi-head attention mechanism and combines residual connections with layer normalization. A formula for data processing flow is as follows:

$$H_2' = LayerNorm(H_2 + FFN(H_2))$$
$$H_2 = LayerNorm(H_1 + Attention(H_1 W_1^Q, H_1 W_1^K, H_1 W_1^V))$$

wherein $H_1$ represents intermediate feature representation from the previous layer, which encodes the parameter information of the preliminary representations and the topological connection structures of circuit components (such as resistors, capacitors, or transistors).

$$W_1^Q,$$

$$W_1^K$$

and $$W_1^V$$

are trainable weight matrices in the first-layer attention mechanism, which are used to map the input feature $H_1$ to Query, Key, and Value vectors respectively. In this task, Query represents the structural requirements or target characteristics of the current circuit elements, Key represents the response features of other components, and Value is the actual feature vector used for information aggregation. The attention module obtains the attention weight by calculating the similarity between the Query and the Key (i.e., the coupling degree between components, such as signal path correlation and electrical parameter influence), and then performs weighted aggregation on the Value vector to achieve modeling of the global circuit dependency structure.

The obtained Attention output is added to the original input $H_1$ (residual connection), and then normalized by LayerNorm to obtain the intermediate representation $H_2$, which effectively alleviates the problems of gradient disappearance and feature drift. Subsequently, $H_2$ is further transformed nonlinearly by the feedforward neural network FFN (generally two linear layers+ReLU activation function) to improve the ability to express complex circuit modes (such as feedback structures, or coupling paths), and finally LayerNorm is performed again to obtain $H_2'$ as the output of the current layer.

In this process, the Attention layer can explicitly model the physical and structural relationships between components, while FFN is used to enhance the nonlinear combination capabilities of local features. The combination of the Attention layer and FFN helps to unify the expression of circuit structure and behavior modeling. This layer enhances the global semantic understanding capability while preserving the original features, such as the overall circuit stability, noise sensitivity, and power consumption path.

Subsequent layers further combine circuit templates and historical circuit design cases to extract the overall structure and high-level feature representation of the circuit. During the initialization phase, the initial feature vectors of the task are extracted based on circuit requirements of a user, including structural dimensions (such as the number of components and coupling relationships), parameter distribution (such as statistical features of voltage, resistance, and capacitance), and performance metric requirements (such as frequency response and gain range). After being mapped by a lightweight encoding network, these feature vectors are input into a pre-trained circuit family classifier to determine the circuit type (such as an amplifier, a filter, or a regulator) that is most likely to match this task, and dynamically set the number of layers of the Transformer network based on the task complexity score (such as the degree of nonlinearity and parameter span). In scenarios with complex structures or higher design requirements, the number of layers of the Transformer network may be expanded. By automatically adjusting the number of layers, effective modeling of multi-level circuit structures, complex topologies, and long-range dependencies may be achieved. This process fuses the output features $H_2'$ of the previous layer with the historical circuit encoding $E_{hist}$ by using a multi-layer Transformer network to enhance the recognition ability of different design styles and typical modules.

In this embodiment, structural migration and high-level expression generation are achieved by matching the structural coding (such as topological features and component layout diagram) in the template library with the feature representation state of the current circuit design. The structure generation function is used to extract visual structural information from high-dimensional representations, such as topological connectivity matrices and module boundaries.

In this embodiment, the fused circuit feature representation integrates the structural semantics of the current circuit state and the historical circuit template; $W_s$ is a structural mapping matrix, which is used to project a high-dimensional feature space into a structural label space; $b_s$ is a bias vector; σ is an optional activation function (such as softmax or sigmoid), which is used to generate module attribution probability or edge connection strength; the output S represents a set of structural matrices, including intermediate visualization structural information such as the topological connection matrix A and the module boundary vector M.

In this embodiment, key design features are extracted from $H_{final}$, which is a specific mapping function that combines Transformer output, structural encoding, and historical case representation design.

$$H_{final}^{(i)}$$

Represents a final feature sequence after fusion; GlobalAvgPool averages the feature vectors at all positions to extract the global circuit behavior representation; $W_f$ and $b_f$ are the weights and biases of the high-dimensional mapping layer (MLP); and the output F represents the extracted key design feature vector.

In this embodiment, F represents a high-level circuit feature vector extracted from the fusion module, covering key design metrics such as noise margin, power supply stability coefficient, and reliability score;

an expression for the matching score is as follows:

$$s_{i_1 j_1} = \cos(f_{i_1}, t_{j_1}) = \frac{f_{i_1} \cdot t_{j_1}}{\|f_{i_1}\| \cdot \|t_{j_1}\|}$$

wherein $s_{i_j j_1}$ is a matching score between $f_{i_1}$ and $t_{j_1}$; COS is a cosine similarity calculation function; $f_{i_1}$ is an $i_1^{th}$ feature of the high-level feature representation; $t_{j_1}$ is a $j_1^{th}$ embedding representation; and $\|\cdot\|$ is the norm of the vector.

In this embodiment, to further determine the matching degrees between the current design and the templates in the template library, a matching scoring mechanism based on cosine similarity is introduced. According to the matching results, a group of template structures that are highly relevant to the current design are screened out to form a matching template set. This set not only provides a reference framework for structure generation, but also provides candidate solutions for subsequent circuit topology fine-tuning.

The initial circuit structure is quickly generated based on the typical connection mode and component configuration in the matching template; in addition, fine-tuning at key nodes (such as adjusting module boundaries, inserting or replacing components, and optimizing connection paths) may be guided by comparing the structural differences between the matching template and the current design, thereby improving the performance and feasibility of the circuit and reducing design risks.

When EDA software specified in user input corresponds to a standard netlist format stored in a knowledge base, the currently generated circuit design data (including component types, connection relations and parameter values) is mapped into a standard netlist representation format which accords with the analysis requirements of a target EDA tool in a structuring mode according to a circuit template which is associated with the successfully matched high-level features. The successfully matched features have clear structure guidance and parameter setting, which may be directly used for a netlist generation process. For the high-level features that fail to successfully match the template, a backtracking mechanism is enabled. Based on the experience of similar designs in historical circuit cases, the most likely circuit structure or parameter configuration is inferred for completion to ensure the correctness and compatibility of subsequent simulation and verification processes. The symbols corresponding to the key entities are extracted from the component symbol library for one-to-one correspondence. The key entities are automatically identified from the circuit template based on the circuit design requirements of a user and reasoning model. For example, based on the functional requirements of the design (such as low-noise amplifiers and filters), the circuit modules involved (such as transistors and operational amplifiers) are identified. The component models required for the design correspond to the process library (PDK) provided by the process manufacturer. The component models required for the design refer to the specific models of the components in the standard component library that meet the circuit design requirements (such as a capacitor, a resistor, a transistor and other models). These models contain the electrical characteristics, behavioral models and corresponding physical structures of the components. The specific required process is determined by matching with the component information in the process library.

A proper circuit template (such as a common module structure of an amplifier and a filter) is automatically selected according to the circuit design requirements of a user by combining a circuit template, a component library, a circuit standard design rule and a historical circuit design case in a knowledge base, so that a basic frame is provided for design. The circuit template includes not only the structure for functional implementation, but also the common module connection methods and layout. The component library provides specific component models, parameters and symbols for each circuit module, selects appropriate components from the component library automatically according to the modules defined in the template, and endows the appropriate electrical characteristics and symbols for the components, so that the accuracy and the implementation of design are ensured. The circuit standard design rule ensures that the design meets all constraint conditions (such as netlist compiling format and component parameters), and ensures the validity of the design by automated checks to avoid errors or non-compliance with standards during the design process. In addition, historical circuit design cases provide successful experiences and failed lessons from similar designs. By comparing the features of the current design with the designs in historical cases, potential design problems can be identified, and successful experiences can be learned or repeating past mistakes can be avoided, thereby optimizing the current design.

On this basis, firstly, data preprocessing is performed on circuit parameters (such as resistance values, voltage values and frequencies) in user requirements, and the physical quantities are converted into calculable numerical representations mainly by methods such as normalization and discretization coding, so as to enhance the resolvability and the generalization capability of the method. These circuit parameters specifically refer to the technical metrics of each component in the circuit, such as resistance, capacitance, voltage, and current frequency. After preprocessing, the data may be scaled to facilitate subsequent reasoning calculations. The model then extracts a high-dimensional feature vector of the circuit by calculating key circuit features such as resonant frequency, gain characteristics, and impedance matching parameters. The calculation of the resonant frequency is based on the formula of the LC circuit or the RC circuit, the gain characteristic is obtained by the gain calculation formula, and the impedance matching parameter is performed by calculating the matching degree of the input/output impedance and the load impedance. These key features are used to construct a high-dimensional feature vector of the circuit, which represents the electrical performance and behavioral features of the circuit. Then, the high-dimensional feature vector is converted into a compact low-dimensional feature representation by a dimension reduction method (such as PCA or an automatic encoder), so that the computational complexity may be reduced, and the matching efficiency may be improved. Finally, the compact feature representations are used as query vectors, which are not only used to match the netlist encoding in the structural template library, but also to assist in querying historical circuit designs in the cache to introduce empirical structures or parameter settings, thereby improving the rationality and convergence speed of the design. The data of historical circuit designs are usually stored in vector form, including component parameters, circuit features, and performance metrics (such as gain, frequency response, and stability). These historical design vectors are matched with the query vector of the current design by calculating similarity (such as cosine similarity or Euclidean distance) to find the historical design most similar to the current design, and recursive reasoning and optimization are performed based on this design.

When the calculated similarity between the input features and the key-value pair in the cache exceeds a set threshold, the most relevant circuit pattern (i.e., the circuit structure similar to the current design requirements) is dynamically retrieved, and the neural units related to "symbol recognition, formula matching, and netlist generation" are gradually triggered.

The symbol recognition neuron extracts the symbol features of components by self-supervised learning, and performs pattern matching and connection rule analysis by combining a graph neural network so as to recognize a circuit topological structure and construct a preliminary circuit diagram representation. In this process, the calculated circuit parameters (such as resistance, voltage and frequency) and circuit features (such as resonant frequency, gain characteristics and impedance matching parameters) are used as input data to help understand the electrical behavior and performance metrics of each component. The symbol recognition neuron extracts the symbol features of each component, such as the graphic symbols of resistors, capacitors, transistors and other components from the circuit template by using self-supervision learning, and constructs high-dimensional feature representation of the symbols by learning the relationship among the geometric shape, the size and the electrical parameters of each symbol. The graph neural network identifies the relationship between different circuit modules (such as the connection method of a gain amplifier and a filter) by capturing graph structure information of elements in the circuit as nodes and electrical connection between the elements as edges and analyzing the features of the nodes and the edges. In the process of pattern matching, not only the relationship of electrical connections is analyzed, but also matching is performed in combination with symbol features to ensure accurate identification of the layout of circuit modules and electrical connections. Based on the analysis of graph neural networks, symbol recognition neurons can infer the topological structure of the circuit and establish a preliminary circuit diagram representation, thereby providing a basis for subsequent netlist generation and circuit simulation. The circuit diagram representation includes specific positions, connection modes and electrical relationships of the components, which is not just the arrangement of components, but also a structured representation that includes electrical characteristics, and can provide an accurate preliminary design framework for circuit optimization and verification.

The formula matching neuron searches an optimal circuit equation by an attention mechanism, and calculates and matches the extracted feature parameters with the circuit equations to derive key circuit metrics such as resonant frequency, gain and impedance. The calculated circuit parameters (such as resistance, capacitance, voltage and frequency) and circuit features (such as gain and frequency response) are used as input, so that the formula matching neurons are helped to accurately find an equation suitable for the current circuit design. Specifically, the attention mechanism enables neurons to prioritize the most relevant equations for matching among a large number of possible circuit equations. After matching, the neuron further derives performance metrics of the circuit, such as resonant frequency (according to the formula of the LC circuit or the RC circuit), gain (by a gain calculation formula), and impedance (by analyzing the matching degree of the input/output impedance and the load impedance). Through the calculation results, the neuron can optimize and adjust the key parameters of the circuit to ensure that the circuit performance meets the design requirements and standards.

Based on this, the netlist generation neuron converts the symbolized circuit topology (circuit structure obtained by symbol recognition and graph neural network) into a standardized circuit description language by using a multi-layer perceptron for nonlinear transformation. Specifically, the symbolized circuit topology information includes component types, connection relationships, parameters and the like, the information is processed by a netlist generation neuron by a multi-layer perceptron, the structure and behavior features of the circuit are extracted, and the circuit topology information is converted into a netlist format meeting the requirements of EDA software. This process not only involves the standardization of circuit elements and the parameters thereof, but also ensures that every connection relationship in the circuit complies with the netlist compilation specification. Finally, the neurons generate a netlist that meets the analysis requirements of a simulation tool and EDA software by the transformed representations, which provides a basis for subsequent simulation and verification.

During the entire reasoning process, a chain thinking prompt method is used to guide the user to gradually disassemble the problem and generate step-by-step results in the logical order of symbol recognition, circuit parameter calculation, and netlist conversion. When calculating weight distribution, parameter matching results, or connection relationships, the internal structure and mutual relationship of the input data are analyzed to determine whether there is ambiguity. Specifically, potential conflicts or inconsistencies are identified using a rules engine and a deep learning model based on the calculated circuit features, component parameters, and circuit topology. For example, when parameter matching is performed, the abnormal condition that parameters of a plurality of components in the circuit are inconsistent or cannot meet predetermined design requirements is detected, and whether backtracking needs to be performed is determined according to a preset tolerance threshold. Similarly, when there is ambiguity in the connection relationship, if the connection relationship of certain nodes (components) in the circuit diagram is unclear or does not match the circuit function requirements, the backtracking mechanism is identified and triggered.

The core of the backtracking mechanism is to make corrections based on the error type, current netlist and correction suggestions. First, the ambiguous portion is classified to identify the error type. Common error types include parameter mismatch (such as inconsistent resistance and capacitance values), connection relationship errors (such as disconnected signal paths, or improper input/output connections of circuit modules), and circuit function mismatch (such as insufficient gain, and frequency response that does not meet requirements). For each error type, a correction suggestion is generated based on the historical case, the design specification, and the previous calculation results. For example, when it is found that the resistance value is not consistent with the expectation, it may be recommended to change the resistance value or select a resistor of a different specification; when a connection relationship error is identified, the connection method is automatically adjusted according to the circuit topology and functional requirements to ensure that the signal path is correct.

Once the error type is identified and classified, the error is corrected by recursive reasoning based on historical design experience and optimization strategies. Specifically, a part of the netlist is regenerated based on the correction suggestions, and whether the modified circuit parameters and the connection relation meet the design requirements or not is verified. If there are still problems with the corrected netlist, backtracking is continuously executed, and iteration is performed according to different correction solutions until the circuit design meets all design specifications and functional requirements.

In this way, the backtracking mechanism can not only automatically identify potential problems in circuit design, but also perform precise repairs based on error types and correction suggestions, thereby ensuring the accuracy and feasibility of circuit design.

After all key steps are completed, the complete netlist file is finally output and integrated to meet the standard syntax format requirements of the simulation software.

The error information includes the error type and error location.

The correcting the current circuit netlist based on the error information is specifically as follows:
 based on the error location, finding a corresponding node and taking a preset correction action based on the error type.

In this embodiment, protocol communication is automatically established between the local computer and the server, an EDA tool installed in the server is called, simulation test is performed on the netlist by EDA software in the server, a generated simulation result is returned to the local computer, a log file is automatically created, and the simulation result is stored.

Error diagnosis and correction module: First, the simulation log is parsed, and the error types in the netlist, including syntax errors (such as missing component parameters and incorrect connection formats), physical constraint violations (such as impedance mismatch and abnormal bias points), and circuit performance deviations (such as gain and noise figure out of the design range) are identified.

Error information is then extracted based on regular expression and AST parsing, which typically includes the following categories:

Firstly, error type, which refers to the specific type of problem detected in the circuit design, such as parameter mismatch, connection error and circuit function mismatch; secondly, error location, which indicates the specific location where the error occurred, such as the pin connection error of a specific component, or a signal path that is not connected correctly. The error description is a specific description of the problem, such as "The resistance value is out of the allowable range" or "The input port is not connected to a suitable voltage source". In addition, the contextual information of the error is also included, such as the relevant circuit parameters (such as the specific values of resistors and capacitors) and connection status (such as the path of the connection line and the location of components) when the error occurs.

The data expression form of these error messages is a structured text or digital format. For example, the error messages may be converted into a JSON format, which includes the following fields: error type, error location, error description, context parameters, and the like. Specifically, each component and the connection relation thereof are identified by parsing the netlist and the graphic information of the circuit design, and then the formula or the connection expression in the circuit design is subjected to pattern matching by the regular expression, so that potential errors are extracted. For example, when analyzing resistors, it may be detected that the value of a certain resistor does not meet design specifications, or when connecting certain two components, the signal line is not properly wired into the circuit.

These error messages are extracted and used as input data for further analysis. Upon receiving such input data, historical design experience and optimization strategies are used to generate rework suggestions including, but not limited to, adjusting parameters, rearranging circuit connections, replacing components, and the like. In this way, errors can be automatically identified and repaired in the circuit design, thereby improving the accuracy and efficiency of the design.

During the iterative correction process, the netlist is dynamically adjusted based on the error category. For syntax errors, grammatical problems in the circuit description, such as component connection errors, wrong component symbols or expression modes which do not meet netlist compiling specifications, are first identified. The syntax errors usually occur when the netlist format is incorrect, for example, the connection expression between components is illegal, or the description of electrical parameters does not conform to the prescribed format (such as the wrong parameter unit). When the errors are corrected, the non-compliant parts are automatically modified based on the regular expression and the rules of the standard netlist format, and converted into correct structures that meet syntax requirements. The corrected netlist is restored to a valid representation that conforms to a standard netlist format and may continue to be input into the simulation software for subsequent processing.

Parameter anomalies usually refer to physical constraint violations in circuit design, such as the value of a component exceeding the specified tolerance range (for example, the resistance value is too small or the capacitance value is too large), or the electrical characteristics of the circuit design (such as current, voltage) exceed the maximum tolerance of the component. Common parameter settings in similar designs are analyzed by comparing with historical circuit design cases, and the parameters in the current design are adjusted based on this historical data. For example, when it is found that the resistance value is out of the preset range, a proper resistance value meeting the circuit performance requirement may be selected and automatically adjusted with reference to the successful design in the historical case. The adjusted parameters are reflected in the new netlist to ensure that the circuit design is within the physical constraints.

Circuit performance deviation usually refers to the difference between simulation results and design goals, for example, parameters such as gain, frequency response, and power consumption fail to meet the predetermined goals. First, the deviations between the design goals and simulation results are calculated to identify the sources and key factors of the deviations. Based on these deviations, the circuit topology and critical parameters (such as component values and bias point settings) are analyzed and corrected. Specifically, if the simulation results indicate that the gain is insufficient, the bias point of the gain amplifier may be adjusted or more appropriate components may be selected, or if the frequency response does not meet the requirements, the filter parameters may be re-optimized or the component connections may be adjusted. The correction process is performed for key parts of the circuit, such as optimizing input/output impedance of the circuit and adjusting a frequency response curve to ensure that the design may meet target requirements. Each corrected netlist is re-entered into the simulation software for verification until the simulation results meet the design requirements.

What is claimed is:

1. An AI-based automated circuit generation method, comprising:
    obtaining design metrics and storing the design metrics as structured data; wherein the design metrics comprise circuit performance metrics, component metrics, circuit type metrics, and component connection methods;
    capturing a dependency relationship among design metrics by using an attention mechanism, extracting features by using a multi-layer Transformer structure to obtain an overall structure and a high-level feature representation of a circuit, and matching the high-level feature representation with a standard circuit netlist template based on the overall structure of the circuit to obtain a current circuit netlist;
    simulating the current circuit netlist to obtain a simulation report, and extracting error information from the simulation report; and
    correcting the current circuit netlist based on the error information, simulating a corrected circuit netlist again, looping several times until there are no errors in the simulation report, and outputting a final circuit netlist;

wherein the extracting features by using a multi-layer Transformer structure to obtain an overall structure and a high-level feature representation of a circuit comprises:
a first-layer Transformer structure, used to extract a local parameter relationship based on the dependency relationship among the design metrics;
a second-layer Transformer structure, used to extract global features based on the local parameter relationship; and
a third-layer Transformer structure, used to extract the overall structure and the high-level feature representation of the circuit based on global features, combined with circuit templates and historical circuit design cases;
wherein the obtaining a current circuit netlist comprises:
calculating relevant weights of the design metrics by using normalization operation according to the structured data:

$$w_i = \frac{\exp(s_i/T)}{\sum_j \exp(s_j/T)}$$

wherein $w_i$ is a relevant weight of an $i^{th}$ design metric; $s_i$ is an initial weight score of a $i^{th}$ design metric; T is a temperature coefficient; $s_j$ is an initial weight score of a $j^{th}$ design metric;
calculating a dependency relationship among design metrics by using an attention mechanism:

$$\text{Attention}(Q, K, V) = \text{softmax}\left(\frac{QK^T}{\sqrt{d_k}} + B\right)V$$

wherein Attention (Q, K, V) is a dependency relationship between a current design metric and all design metrics; soft max is an activation function; Q is a query matrix, which represents the current design metric; K is a key matrix, which is composed of various design metrics; $d_k$ is a key dimension; B is a bias term; V is a value matrix, which represents a weight vector related to the design metric; T is transpose;
extracting features by using a multi-layer Transformer structure according to the dependency relationship among design metrics to obtain an overall structure and a high-level feature representation of a circuit;
calculating matching scores of features in the high-level feature representation and embedded representations in the standard circuit netlist template, and extracting embedded representations of which matching scores are greater than a threshold to obtain a matching template set; and
based on the overall structure of the circuit, selecting any one embedded representation from the matching templates of features in the high-level feature representation, and obtaining the current circuit netlist based on the embedded representations selected corresponding to the features.

2. The AI-based automated circuit generation method according to claim 1, wherein the extracting a local parameter relationship based on the dependency relationship among the design metrics is specifically as follows:

linearly transforming and positionally encoding structured data to obtain input data extracted from the circuit:

$$Q_{in} = XW^Q$$

$$K_{in} = XW^K$$

$$V_{in} = XW^V$$

wherein $Q_{in}$ is a query vector of input data extracted from the circuit; X is the structured data; $W^Q$, $W^K$ and $W^V$ are all trainable weight matrices; $K_{in}$ is a key vector of input data extracted from the circuit; $V_{in}$ is a value vector of input data extracted from the circuit; and
inputting the input data extracted from the circuit into a multi-head self-attention mechanism to obtain the local parameter relationship; wherein a bias term of the multi-head self-attention mechanism of the first-layer Transformer structure is the dependency relationship among design metrics.

3. The AI-based automated circuit generation method according to claim 1, wherein an expression for the global feature is as follows:

$$H'_2 = \text{LayerNorm}(H_2 + FFN(H_2))$$

$$H_2 = \text{LayerNorm}(H_1 + \text{Attention}(H_1 W_1^Q, H_1 W_1^K, H_1 W_1^V))$$

wherein $H_2'$ is the global feature; LayerNorm is layer normalization operation; $H_2$ is an intermediate representation; FFN is a feedforward neural network; $H_1$ is the local parameter relationship; and $$W_1^Q,$$

$$W_1^K$$

and $$W_1^V$$

are all trainable weight matrices that map data to vectors.

4. The AI-based automated circuit generation method according to claim 1, wherein an expression for the overall structure and the high-level feature representation of the circuit is as follows:

$$S = f_{struct}(H_{final}) = \sigma(W_s \cdot H_{fused} + b_s)$$

$$H_{final} = \text{Concat}(H'_2, E_{hist})W_{fusion}$$

$$F = f_{feat}(H_{final}) = MLP(GlobalAvgPool(H_{final})) = W_f \cdot \left(\frac{1}{n}\sum_{i=1}^{n} H_{final}^{(i)}\right) + b_f$$

wherein S is the overall structure of the circuit; $f_{struct}$ is a structure generation function; $H_{final}$ is a final fused hidden state; σ is an activation function; $W_s$ is a structure mapping matrix used to project a high-dimensional feature space into a structure label space; $H_{fused}$ is a circuit feature representation that combines structural semantics of a current circuit state and a historical circuit template; $b_s$ is a bias vector; Concat is connection operation; $H_2'$ is the global feature; $E_{hist}$ is historical circuit encoding; $W_{fusion}$ is a fusion weight matrix; F is a high-level feature representation; $f_{feat}$ is a high-dimensional feature mapping function used to extract key design features from the final fused hidden state $H_{final}$; MLP is a high-dimensional mapping layer; GlobalAvgPool is global average pooling; $W_f$ is a weight of the high-dimensional mapping layer; n is a number of structural units in the circuit;

$H_{final}^{(i)}$ is a final feature sequence after fusion; and $b_f$ is a bias of the high-dimensional mapping layer.

5. The AI-based automated circuit generation method according to claim 1, wherein an expression for the matching score is as follows:

$$s_{i_1 j_1} = \cos(f_{i_1}, t_{j_1}) = \frac{f_{i_1} \cdot t_{j_1}}{\|f_{i_1}\| \cdot \|t_{j_1}\|}$$

wherein $s_{i_1 j_1}$ is a matching score between $f_{i_1}$ and $t_{j_1}$; COS is a cosine similarity calculation function; $f_{i_1}$ is an $i_1^{th}$ feature of the high-level feature representation; $t_{j_1}$ is a $j_1^{th}$ embedding representation; and $\|\cdot\|$ is the norm of the vector.

6. The AI-based automated circuit generation method according to claim 1, wherein the error information comprises error type and error location.

7. The AI-based automated circuit generation method according to claim 6, wherein the correcting the current circuit netlist based on the error information is specifically as follows:

based on the error location, finding a corresponding node and taking a preset correction action based on the error type.

* * * * *